Sept. 27, 1966 R. N. BOSE 3,274,730
UNDERGROUND GAS DIFFUSION SYSTEM
Filed May 8, 1964
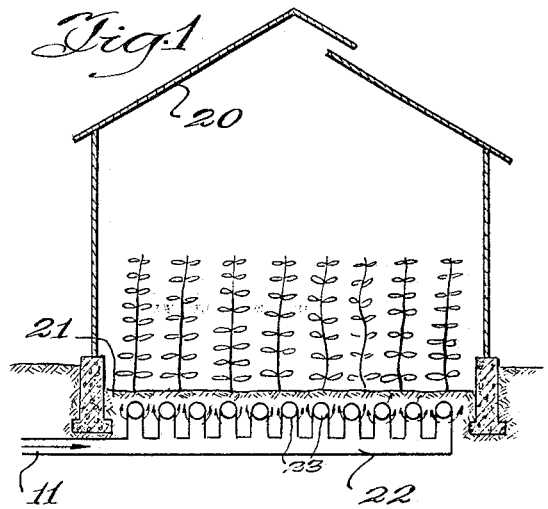
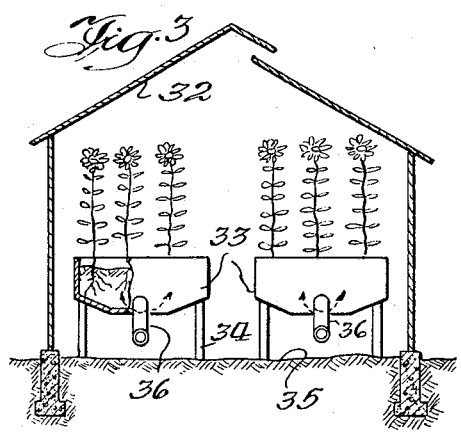
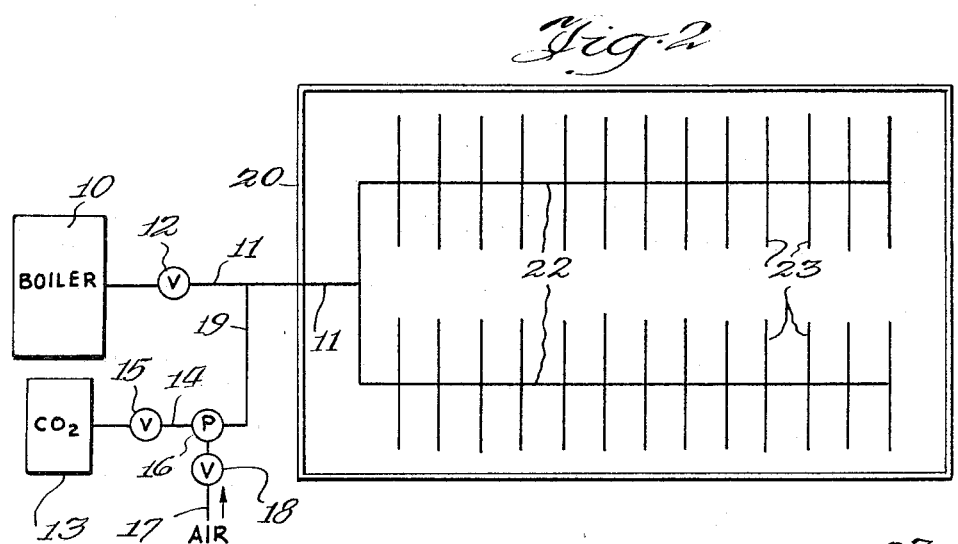
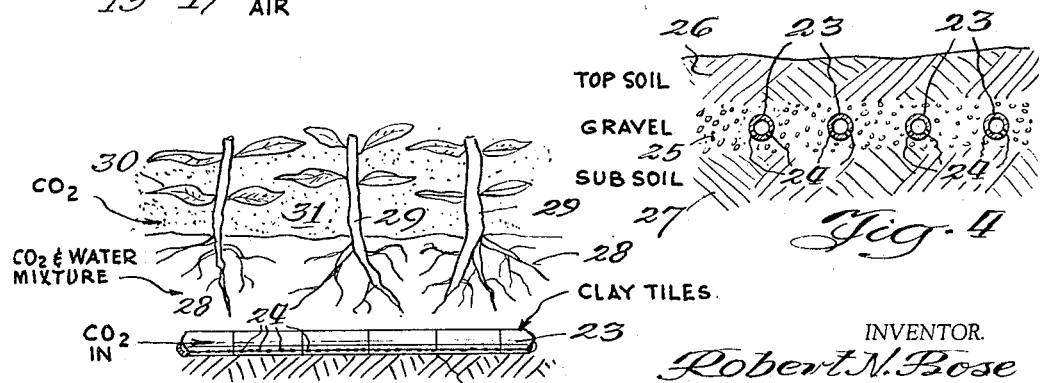
INVENTOR.
Robert N. Bose

United States Patent Office

3,274,730
Patented Sept. 27, 1966

3,274,730
UNDERGROUND GAS DIFFUSION SYSTEM
Robert N. Bose, St. Joseph, Mich., assignor to Whirlpool Corporation, a corporation of Delaware
Filed May 8, 1964, Ser. No. 365,985
6 Claims. (Cl. 47—1)

This invention relates to apparatus for supplying carbon dioxide or other nutrient gases to vegetation such as plants growing in moisture containing soil such as ground soil, perlite, peat or sand.

One of the features of this invention is to provide improved apparatus for supplying carbon dioxide to plants growing in moisture containing soil in which the apparatus comprises gas permeable conduit means in the soil, a gaseous nutrient supply means and means for flowing gaseous nutrient from the supply means through the conduit means and into the soil for, first, contact of the gaseous nutrient with the below the soil portions of the plants, second, for solution in the moisture in the soil for later utilization by the plants and, third, for upward diffusion contact with the above the soil portion of the plants.

Another feature of the invention is to provide an improved combined apparatus including a device for sterilizing soil for growing plants including a source of steam, gas permeable soil conduit means in the soil and means for using this conduit means not only for the steam to produce a sterilizing action but also for supplying carbon dioxide or other nutrient gases to the soil and thus to the plants in the manner set out in the preceding paragraph.

Other features and advantages of the invention will be apparent from the following description of certain embodiments thereof as shown in the accompanying drawings. Of the drawings:

FIGURE 1 is a semi-diagrammatic elevation of one embodiment of the apparatus.

FIGURE 2 is a schematic view of the piping system and steam, carbon dioxide and air supply of the apparatus of FIGURE 1.

FIGURE 3 is a view similar to FIGURE 1 but illustrating a second embodiment of the invention.

FIGURE 4 is a sectional view illustrating the placing of the gas permeable conduits in the soil.

FIGURE 5 is an elevational view also showing the placing of the conduits in the soil and the relationship thereof to plants growing in the soil.

In the embodiment of FIGURES 1 and 2 there is provided a boiler 10 as a source of steam and having a steam line 11 leading therefrom provided with a valve 12 and a source 13 of nutrient gas, carbon dioxide in this embodiment, which may be a high pressure tank filled with carbon dioxide or other nutrient gas under pressure. A line 14 provided with a valve 15 leads from the carbon dioxide source 13 to a two-way pump 16. Leading into this pump 16 is an air line 17 also provided with a valve 18. A line 19 leads from the pump 16 and connects onto the line 11. The line 11 leads into a greenhouse 20 beneath the soil 21 thereof. The line 11 is connected to parallel branch lines 22 of which two are shown but which may be any number desired, depending upon the size of the greenhouse 20. Each branch line 22 is provided with cross parallel feeder lines 23 also located beneath the top surface of the soil 21.

Each of the lines 22 and 23 may be clay tile that is gas permeable, as by containing perforations 24 of which only a representative few are shown in FIGURE 5 or by having loose connecting ends 24a of the tile sections through which the gas may escape. This tile, as illustrated in FIGURE 4, is preferably located in loose gravel 25 so that gases from within the tile come up into the soil.

Above the gravel 25 is the usual top soil 26 and beneath it is the usual subsoil 27. As is shown in FIGURE 5, the roots 28 of the plants 29 are located in the top soil above the cross lines 23 and branch lines 22. These roots constitute the below ground portions and the stems and leaves of the plants constitute the above ground portions 30.

The apparatus of this invention therefore provides an underground diffusion system for supplying carbon dioxide or other nutrient gases to growing plants with this carbon dioxide being supplied by the gas permeable conduit means for contact with the underground portions or roots 28, the above ground portions 30 and for dissolving in the moisture in the soil for later use by the plants. During use the carbon dioxide diffuses from the conduits 22 and 23 into the gravel 25 and from there into the top soil 26. The carbon dioxide that is not retained in the top soil or used immediately by the roots 28 diffuses upwardly into the atmosphere as indicated at 31. This diffused carbon dioxide contacts the above ground portions including the stems and leaves 30 for further stimulation of the plant growth. This diffused carbon dioxide is particularly effective, as it contacts the undersides of the leaves where the plant is most efficient in utilizing the carbon dioxide.

The carbon dioxide supply system of this invention is particularly adaptable for use in conjunction with the ordinary steam sterilizing system utilized by green houses. Thus, the carbon dioxide supply may use the same conduits that are used to supply steam, as from the boiler 10, into the soil for destroying harmful microorganisms.

FIGURE 3 illustrates a second embodiment of the invention in which the greenhouse 32 contains spaced boxes 33 elevated on legs 34 above the ground surface 35. The conduits 36 to the boxes are similar to the conduit 11 in the first embodiment.

In order to stimulate growth from carbon dioxide in the air the necessary supply is usually between 1200–1500 parts per million. By contacting both the below ground portions and the above ground portions of the plant with carbon dioxide, the apparatus of this invention provides much more efficient stimulation than where the carbon dioxide is supplied only to the above ground atmosphere.

As previously described, the apparatus of this invention preferably provides both air from a source 17 and carbon dioxide from a source 13. The air not only dilutes the carbon dioxide but aerates the soil and supplies oxygen to the plants in the same diffusion technique as the carbon dioxide is supplied. The mixture of air and carbon dioxide preferably contains not more than about 2% carbon dioxide and about 98% air, both by volume.

Having described my invention as related to the embodiments shown in the accompanying drawings, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. Apparatus for supplying carbon dioxide to plants growing in moisture containing soil, said plants having below the soil and above the soil portions, comprising: gas permeable conduit means in said soil; a gaseous carbon dioxide supply means; and means for flowing carbon dioxide from said supply means, through said conduit means and into said soil for contact with said below soil portions, for solution in said moisture, and for upward diffusion contact with said above soil portions.

2. Apparatus for supplying carbon dioxide to plants growing in moisture containing soil, said plants having below the soil and above the soil portions, comprising: gas permeable conduit means in said soil; a gaseous carbon dioxide supply means; an air supply means; means for mixing carbon dioxide and air from the respective supply means to form a mixture; and means for flowing said mixture from said supply means, through said conduit means and into said soil for contact with said below soil portions, for solution in said moisture, and for upward diffusion contact with said above soil portions.

3. Apparatus for supplying carbon dioxide to plants growing in moisture containing soil, said plants having below the soil and above the soil portions, comprising: means enclosing said soil and said plants; gas permeable conduit means in said soil; a gaseous carbon dioxide supply means; and means for flowing carbon dioxide from said supply means, through said conduit means and into said soil for contact with said below soil portions, for solution in said moisture, and for upward diffusion contact with said above soil portions, said enclosing means serving to maintain said carbon dioxide in contact with said above soil portions.

4. Apparatus for supplying carbon dioxide to plants growing in moisture containing soil, said plants having below the soil and above the soil portions, comprising: means enclosing said soil and said plants; gas permeable conduit means in said soil; a gaseous carbon dioxide supply means; an air supply means; means for mixing carbon dioxide and air from the respective supply means to form a mixture; and means for flowing said mixture from said supply means, through said conduit means and into said soil for contact with said below soil portions, for solution in said moisture, and for upward diffusion contact with said above soil portions, said enclosing means serving to maintain said carbon dioxide in contact with said above soil portions.

5. A device for sterilizing soil containing moisture and for supplying carbon dioxide to plants growing in said soil and having below the soil and above the soil portions, comprising: a source of steam; gas permeable conduit means positioned in said soil; means for directing steam from said source into said conduit means for sterilizing contact with said soil; a gaseous carbon dioxide supply means; an air supply means; means for mixing carbon dioxide and air from the respective supply means to form a mixture; and means for flowing said mixture from said supply means, through said conduit means and into said soil for contact with said below soil portions, for solution in said moisture, and for upward diffusion contact with said above soil portions.

6. A device for sterilizing soil containing moisture and for supplying carbon dioxide to plants growing in said soil and having below the soil and above the soil portions, comprising: a source of steam; gas permeable conduit means positioned in said soil; means for directing steam from said source into said conduit means for sterilizing contact with said soil; means enclosing said soil and said plants; a gaseous carbon dioxide supply means; an air supply means; means for mixing carbon dioxide and air from the respective supply means to form a mixture; and means for flowing said mixture from said supply means, through said conduit means and into said soil for contact with said below soil portions, for solution in said moisture, and for upward diffusion contact with said above soil portions, said enclosing means serving to maintain said carbon dioxide in contact with said above soil portions.

References Cited by the Examiner
UNITED STATES PATENTS

| | | | |
|---|---|---|---|
| 1,967,803 | 7/1934 | Boland. | |
| 2,536,196 | 1/1951 | MacLead. | |
| 2,854,792 | 10/1958 | Juda | 47—58 |
| 3,068,616 | 12/1962 | Shibata et al. | 47—1 |

ABRAHAM G. STONE, *Primary Examiner.*

R. E. BAGWILL, *Assistant Examiner.*